United States Patent [19]
Yoshida

[11] Patent Number: 5,886,796
[45] Date of Patent: Mar. 23, 1999

[54] FACSIMILE APPARATUS

[75] Inventor: Takehiro Yoshida, Tokyo, Japan

[73] Assignee: Canon Kabushiki Kaisha, Tokyo, Japan

[21] Appl. No.: 874,770

[22] Filed: Jun. 13, 1997

Related U.S. Application Data

[63] Continuation of Ser. No. 362,184, Dec. 22, 1994, abandoned.

[30] Foreign Application Priority Data

Dec. 24, 1993 [JP] Japan ................................. 5-348288

[51] Int. Cl.⁶ .............................. H04N 1/32; H04M 11/00
[52] U.S. Cl. ............................ 358/442; 358/406; 358/439
[58] Field of Search ...................................... 358/400, 405, 358/406, 442, 446, 468, 434–436, 438–439; 375/222; H04N 1/32; H04M 11/00

[56] References Cited

U.S. PATENT DOCUMENTS

| | | | |
|---|---|---|---|
| 4,868,852 | 9/1989 | Tsumura | 358/469 |
| 5,150,400 | 9/1992 | Ukegawa | 358/406 |
| 5,282,242 | 1/1994 | Hachinoda | 358/468 |
| 5,289,459 | 2/1994 | Brownlie | 370/17 |
| 5,369,500 | 11/1994 | Jacobs | 358/406 |
| 5,751,442 | 5/1998 | Hamada et al. | 358/442 |

FOREIGN PATENT DOCUMENTS 5-30328  2/1993  Japan .

*Primary Examiner*—Kim Yen Vu
*Attorney, Agent, or Firm*—Morgan & Finnegan, L.L.P.

[57] ABSTRACT

Disclosed is a facsimile apparatus that has a modulating/demodulating device that is operable at a low voltage. The facsimile apparatus of the present invention comprises, in its receiving system, loss means for reducing a level of a received signal; control means for instructing, for the loss means, a reduction value for the level of the received signal; incoming level detection means for storing a voltage value that corresponds to a predetermined level for each transfer mode, and for detecting an incoming level during initial identification procedures; user equalizing means, and comprises, in its transmitting system, gain/loss means, for altering a level of a signal transmitted by a modulating/demodulating device; control means for instructing, for the gain/loss means, a value for alteration of the level of the signal; loss means for reducing the level of the signal; and user equalizing means.

40 Claims, 9 Drawing Sheets

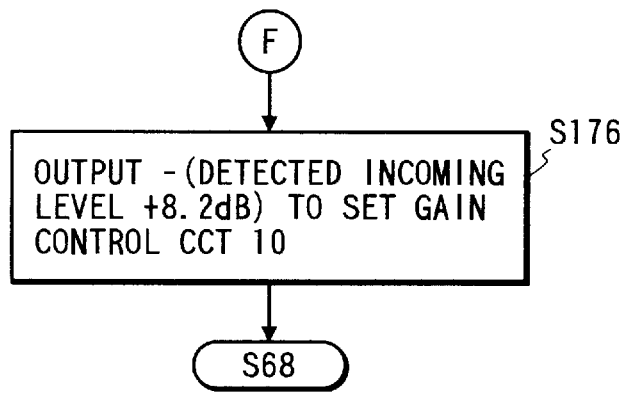
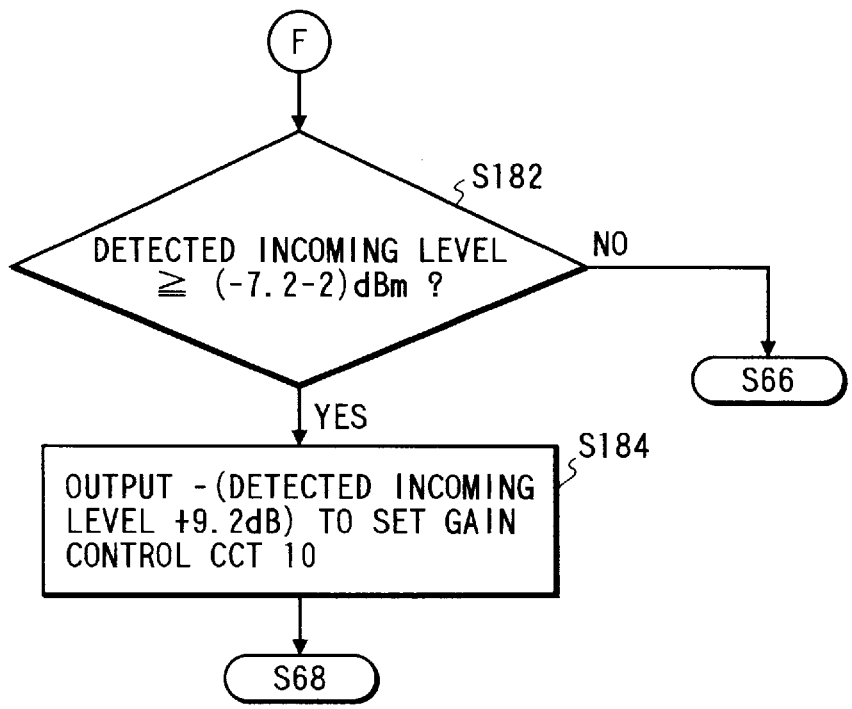

FACSIMILE APPARATUS

This is a continuation of application Ser. No. 08/362,184, filed on Dec. 22, 1994, now abandoned.

BACKGROUND OF THE INVENTION

1. Field of the Invention

The present invention relates to a facsimile apparatus, and in particular to a facsimile apparatus that includes a modulating/demodulating device that can be driven at a low voltage.

2. Related Background Art

There are some conventional modulating/demodulating devices that are driven at high voltages, such as +12 V to −12 V, or +5 V to −12 V, for example. In a facsimile apparatus that employs such a modulating/demodulating device, a peripheral or external circuit (hereafter referred to as a "peripheral circuit") that transmits a signal to, or receives a signal from, an external device is provided on the outside of the modulating/demodulating device. Since the drive voltage for the modulating/demodulating circuit is high, for the transmission of 0 dB a signal from the modulating/demodulating circuit is transmitted externally without being amplified by the peripheral circuit. For reception of 0 dB, a signal from the external device is received by the modulating/demodulating circuit without being amplified by the peripheral circuit.

Recently, in consonance with the high scale circuit integration, such as LSI, defects occur due to the heat generated in a circuit. To eliminate the defect, various highly integrated circuits have been produced, including a modulating/demodulating circuit that is driven at a low voltage, 0 to +5 V, for example. A modulating/demodulating device that is driven by a single power source of +5 V mainly tends to be employed.

Some facsimile apparatuses employ such a modulating/demodulating device that can be driven by a single power source that has a low voltage output.

Since a signal received from, or transmitted to, a modulating/demodulating device that can be driven by a low voltage falls within a voltage range having a maximum limit of 3.5 Vp-p, amplification and attenuation processing by the peripheral circuit is required. When the transmission of 0 dB is to be performed where the prevailing conditions involve a transfer mode of 9600 b/s, the performance of QAM modulation, the provision of an internal 7.2 km cable equalizer in the modulating/demodulating device, and a constant amplification rate for the peripheral circuit, a signal must be sent to a circuit at a level of about 8 Vp-p. Thus, the peripheral circuit has to increase the level by about 7.2 dB. This increased level value is acquired by the following expression:

$$20 \log(8/3.5) = 7.2 \text{(dB)}.$$

Since the amplification rate of the peripheral circuit is a constant value, to transmit a signal of −8.0 dB, for example, the modulating/demodulating device outputs an attenuated signal of 1.39 Vp-p (1.39 Vp-p is acquired as x in $20 \log(x/8.0) = -15.2$). Accordingly, the modulating/demodulating device performs attenuation and the peripheral circuit thereafter performs amplification, which is a wasteful process.

To perform the setting for the receipt of a signal of 0 dB, attenuation of approximately 7.2 dB ($=20 \log(8.0/3.5)$) must be performed by the peripheral circuit. As the attenuation rate of the peripheral circuit is constant, however, when a signal of −40 dB is received, the input level to the modulating/demodulating device is reduced to −47.2 (=−40−7.2) dB and the S/N ratio is accordingly decreased.

In a facsimile apparatus that employs a modulating/demodulating device that can be driven at a low voltage, the S/N ratio will be reduced by a process whereby for transmission a modulating/demodulating device attenuates a signal and thereafter a peripheral circuit amplifies the resultant signal, or a process whereby for reception the peripheral circuit attenuates a received signal and thereafter transmits the resultant signal to the modulating/demodulating circuit, even though the modulating/demodulating circuit can receive a signal directly.

SUMMARY OF THE INVENTION

It is an object of the present invention to provide an improved facsimile apparatus.

It is another object of the present invention to provide a facsimile apparatus that employs a modulating/demodulating device that can be driven at a low voltage so as to prevent the deterioration of the S/N ratio.

BRIEF DESCRIPTION OF THE DRAWINGS

FIG. 12 is a flowchart for explaining the control processing for a facsimile apparatus according to the fifth embodiment of the present invention; and FIG. 13 is a flowchart for explaining the control processing for a facsimile apparatus according to the fifth embodiment of the present invention.

DETAILED DESCRIPTION OF PREFERRED EMBODIMENTS

The preferred embodiments of the present invention will now be described while referring to the accompanying drawings.

(First Embodiment)

Figure 1:
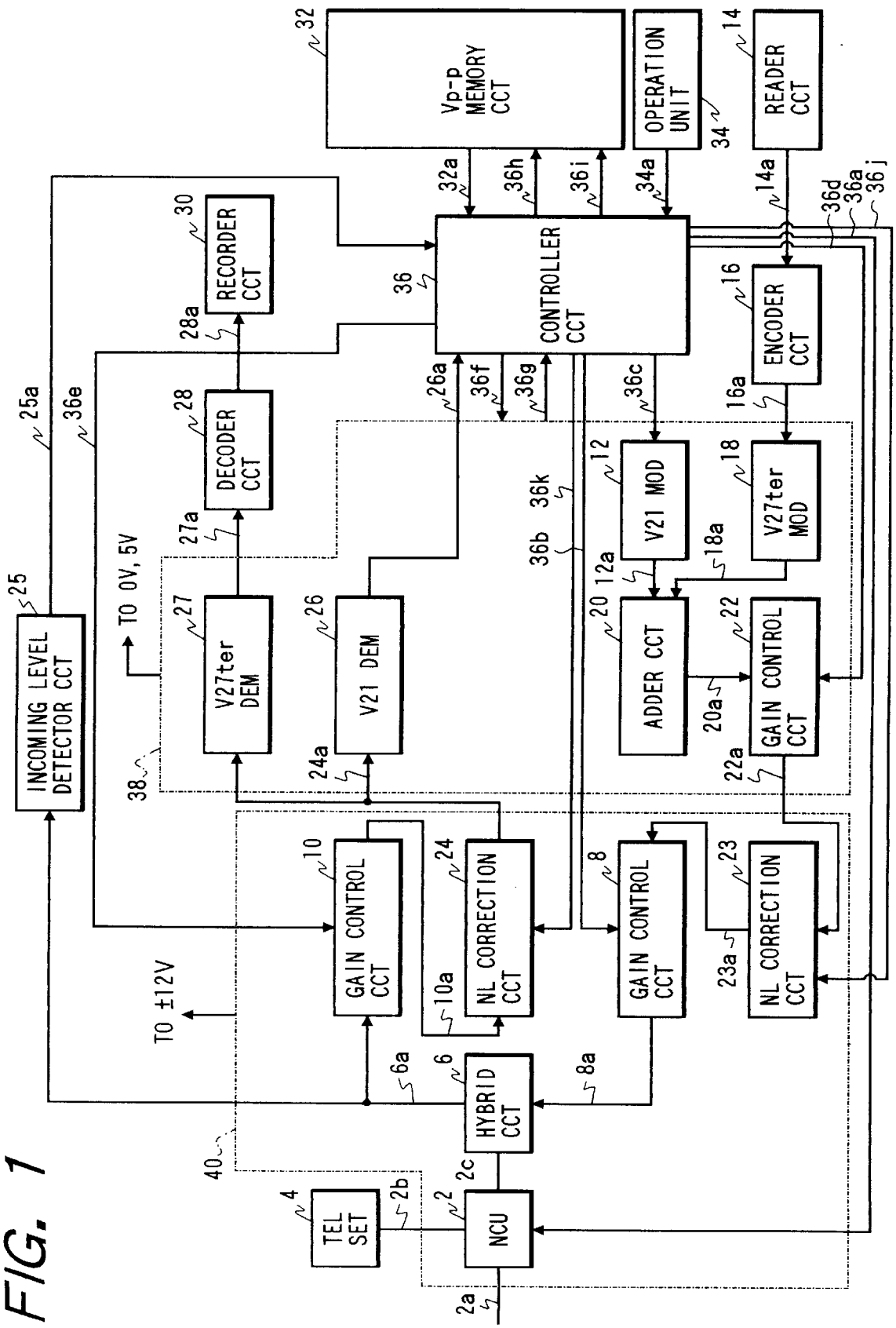
FIG. 1 is a block diagram illustrating the arrangement of a facsimile apparatus according to a first embodiment of the present invention.

FIG. 1 is a block diagram illustrating the arrangement of a facsimile apparatus according to a first embodiment of the present invention.

As is shown in FIG. 1, a facsimile apparatus in this embodiment includes a network control unit (hereafter referred to as an "NCU") 2 that is connected to a telephone line 2a.

The NCU 2 has a terminal connected to the telephone line in order to use the telephone network for data communication, and performs the connection control for a telephone exchange network, the switching to a data communication path, and the maintenance of a loop. In addition, the NCU 2 selectively switches the connection of the telephone line 2a to a telephone set 4 and the connection of the telephone line 2a to a hybrid circuit 6. The NCU 2 is connected to the telephone set 4 by a signal line 2b, while the NCU 2 is connected to the telephone set 4 by a signal line 2c. The switching operation of the NCU 2 is controlled by using a control signal that is output via a signal line 36a from a controller circuit 36, which will be described later. With a control signal level "0", the telephone line 2a is connected to the telephone set 4. With a control signal level "1", the telephone line 2a is connected to the hybrid circuit 6.

The hybrid circuit 6 separates a signal that is transmitted from a transmitting system via the telephone line 2a from a signal that is received by a receiving system via the telephone line 2a.

The transmitting system includes a reader circuit 14 that has an image pickup device, such as a CCD, and an optical system. The reader circuit 14 reads, in order, an image for one line in a main scanning direction from a transmitted document, and generates binary signals for black and white that correspond to the read image. The binary signal from the reader circuit 14 is transmitted to an encoder circuit 16 via a signal line 14a.

The encoder circuit 16 encodes the binary signal sent from the reader circuit 14, and outputs the encoded signal via a signal line 16a. Modified Huffman encoding (MH encoding) or modified READ encoding (MR encoding) is employed.

The encoded signal from the encoder circuit 16 is sent to a V27 ter modulator 18, which in turn modulates the received signal and generates a modulated signal. This process is differential phase modulation that is based on Recommendation V27 ter published by CCITT (Consultative Committee in International Telegraphy and Telephony). Instead of this, orthogonal modulation based on Recommendation V29 can be performed.

The modulated signal from the V27 ter modulator 18 is sent via a signal line 18a to an adder circuit 20. The adder circuit 20 adds a modulated signal, which is output via the signal line 12a by a V21 modulator 12, to the modulated signal from the V27 ter modulator 18. The adder 20 then outputs the resultant signal as a transmission signal via a signal line 20a to a gain control circuit 22. The V21 modulator 12 modulates a signal, which is output via a signal line 36c from the controller circuit 36, and generates a modulated signal. The modulation process is based on CCITT Recommendation V21.

In consonance with the value of a signal that is output along a signal line 36d, the gain control circuit 22 receives a signal that is output along the signal line 20a, and controls a gain of the received signal. When the value of a signal that is output along the signal line 36d is "0", for example, the gain control circuit 22 outputs 0 dBm. When the value of a signal that is output along the signal line 36d is "−3", the gain control circuit 22 outputs −3 dBm. The signal whose gain is adjusted by the gain control circuit 22 is output via a signal line 22a to an NL correction circuit 23.

The NL correction circuit 23, which is a correction circuit for an NL (Non Loaded) cable, receives a signal via the signal line 22a and corrects the signal based on a signal that is output along a signal line 36j. More specifically, when a signal along the signal line 36j has a value of "0", the NL correction circuit 23 does not correct a signal sent via the signal line 22a. When the value of a signal that is output on the signal line 36j is "1", the NL correction circuit 23 performs a correction that is equivalent to 1.8 km on a signal received via the signal line 22a. When the value of a signal that is output on the signal line 36j is "2", the NL correction circuit 23 performs a correction that is equivalent to 3.6 km on a signal received via the signal line 22a. When the value of a signal that is output on the signal line 36j is "3", the NL correction circuit 23 performs a correction that is equivalent to 7.2 km on a signal received via the signal line 22a. A signal from the NL correction circuit 23 is transmitted via a signal line 23a to a gain control circuit 8.

The gain control circuit 8 is provided outside a modulating/demodulating device 38. According to the value of a signal that is output on the signal line 36b, the gain control circuit 8 receives a signal that is output on the signal line 23a and controls the gain of the signal. When a signal that is output on the signal line 36b has a value of "3", the gain control circuit 8 increases the level of a received signal by 3 dB. When the value of a signal that is output on the signal line 36b is "−5", the gain control circuit 8 decreases the level of a received signal by 5 dB. A signal whose gain is adjusted by the gain control circuit 8 is sent via a signal line 8a to the hybrid circuit 6.

The receiving system includes an incoming level detector circuit 25 and a gain control circuit 10. The incoming level detector circuit 25 receives a reception signal that is output via the signal line 6a from the hybrid circuit 6, and determines the incoming dBm unit level of the reception signal. The detected incoming level is thereafter output via a signal line 25a to the controller circuit 36.

The gain control circuit 10 is provided outside the modulating/demodulating device 38. Based on the value of a signal that is output on the signal line 36e, the gain control circuit 10 receives a signal that is output on the signal line 6a and controls the gain of the signal. When the value of a signal that is output on the signal line 36e is "2", the gain control circuit 10 increases the level of a received signal by 2 dB. When the value of a signal that is output on the signal line 36e is "−3", the gain control circuit 10 decreases the level of a received signal by 3 dB. A signal whose gain is adjusted by the gain control circuit 10 is sent via a signal line 10a to an NL correction circuit 24.

The NL correction circuit 24, which is a correction circuit for an NL cable, receives a signal via the signal line 10a and corrects the signal based on a signal that is output along a signal line 36k. More specifically, when the value of a signal that is output along the signal line 36k is "0", the NL correction circuit 24 does not correct a received signal. When the value of a signal output on the signal line 36k is "1", the NL correction circuit 24 performs a correction that is equivalent to 1.8 km on a received signal. When the value of a signal that is output on the signal line 36k is "2", the NL correction circuit 24 performs a correction that is equivalent to 3.6 km on a received signal. When the value of a signal that is output on the signal line 36k is "3", the NL correction circuit 24 performs a correction that is equivalent to 7.2 km on a received signal.

The NL correction circuit 24 is included in a telephone line circuit 40 together with the NCU 2, the hybrid circuit 6, the NL correction circuit 23, and the gain control circuits 8 and 10. The telephone line circuit 40 is operated at −12 V to +12 V.

The signal from the NL correction circuit 24 is transmitted via a signal line 24a to a V21 demodulator 26 and a V27 ter demodulator 27. According to the CCITT Recommendation V21, the V21 demodulator 26 demodulates a reception signal from the NL correction circuit 24 that is output via the signal line 24a, and generates a procedure signal. The procedure signal is sent via a signal line 26a to the controller circuit 36.

The V27 ter demodulator 27 demodulates a signal received from the NL correction circuit 24 and generates a demodulated signal. This demodulation is based on the CCITT Recommendation V27 ter. Instead of this, demodulation that is based on the CCITT Recommendation V29 can be performed.

The V27 ter demodulator 27 is included in the modulating/demodulating device 38, together with the V21 demodulator 26, the V21 modulator 12, the V27 ter modulator 18, the adder circuit 20, and the gain control circuit 22. The modulating/demodulating device 38 is operated at 0V to +5 V.

The demodulated signal from the V27 ter demodulator 27 that is output via a signal line 27a is transmitted to a decoder circuit 28. The decoder circuit 28 decodes the demodulated signal. Modified Huffman decoding (MH decoding) or modified READ decoding (MR decoding) is employed for this process. The decoded data are then sent via a signal line 28a to a recorder circuit 30.

The recorder circuit 30 records line by line the data that are decoded by the decoder circuit 28 on a recording sheet.

The controller circuit 36 controls not only the gain control circuit 22, the NL correction circuit 23, the gain control circuit 8, the gain control circuit 10, and the NL correction circuit 24, but also one touch dialing, speed dialing, and the start up functions.

Data that are stored in a voltage value (Vp-p) memory circuit 32 are employed to control the gain control circuit 22, the NL correction circuit 23, the gain control circuit 8, the gain control circuit 10, and the NL correction circuit 24.

The Vp-p memory circuit 32 stores a value for the Vp-p (peak-to-peak voltage value), at a 600 Ω end terminal, that corresponds to 0 dBm of each of a V21 signal, a tonal signal, a V27 ter (2400 b/s) signal, a V27 ter (4800 b/s) signal, a V29 (7200 b/s) signal, and a V29 (9600 b/s) signal.

To store a Vp-p that corresponds to each signal, data that include a number indicating a signal type, space, and a Vp-p value are input from the controller circuit 36 via the signal line 32a, and then a write pulse is input via a signal line 36h. The types of the received data signals are indicated by the numbers 1 through 6: 1 indicates a V21 signal; 2, a tonal signal; 3, a V27 ter (2400 b/s) signal; 4, a V27 ter (4800 b/s) signal; 5, a V29 (7200 b/s) signal; and 6, a V29 (9600 b/s) signal. An input data example is represented as "2 2.2 Vp-p".

To read the Vp-p that corresponds to each signal, a number (e.g., 2) that indicates one signal type is input from the controller circuit 36 via the signal line 32a, and then a read pulse is input via a signal line 36I. Thereafter, the Vp-p value that corresponds to the signal type for the received data is output via the signal line 32a to the controller circuit 36.

Supposing that, as the Vp-p value at the 600 Ω end terminal that corresponds to 0 dBm for each signal, the V21 signal has a value of 2.5 Vp-p, the tonal signal has a value of 2.2 Vp-p, the V27 ter (2400 b/s) signal has a value of 3.8 Vp-p, the V27 ter (4800 b/s) signal has a value of 4.0 Vp-p, the V29 (7200 b/s) signal has a value of 5.8 Vp-p, and the V29 (9600 b/s) signal has a value of 6.36 Vp-p, and that these signals are passed through the NL correction circuit. The Vp-p values of the signals are increased 0.5 dB by a correction that is equivalent to 1.8 Km, 1.0 dB by a correction that is equivalent to 3.6 Km, and 2.0 dB by a correction that is equivalent to 7.2 Km.

When the correction that is equivalent to 1.8 Km is required, therefore, the increased Vp-p value of the V21 signal is calculated by the following expression and is acquired as 2.65 vp-p:

$$20 \log(x/2.5) = 0.5,$$

wherein x denotes a Vp-p value of a V21 signal after it is increased.

Likewise, the increased Vp-p of the tonal signal is 2.33 Vp-p, the increased Vp-p of the V27 ter (2400 b/s) signal is 4.03 Vp-p, the increased Vp-p of the V27 ter (4800 b/s) signal is 4.24 Vp-p, the increased Vp-p of the V29 (7200 b/s) signal is 6.14 Vp-p, and the increased Vp-p of the V29 (9600 b/s) is 6.73 Vp-p.

When the correction that is equivalent to 3.6 Km is required, the increased Vp-p value of the V21 signal is calculated by the following expression and is acquired as 2.81 Vp-p:

$$20 \log(x/2.5) = 1.0.$$

Likewise, the increased Vp-p of the tonal signal is 2.47 Vp-p, the increased Vp-p of the V27 ter (2400 b/s) signal is 4.26 Vp-p, the increased Vp-p of the V27 ter (4800 b/s) signal is 4.49 Vp-p, the increased Vp-p of the V29 (7200 b/s) signal is 6.51 Vp-p, the increased Vp-p of the V29 (9600 b/s) is 7.12 Vp-p.

When the correction equivalent to 7.2 Km is required, the increased Vp-p value of the V21 signal is calculated by the following expression and acquired as 3.15 Vp-p:

$$20 \log(x/2.5) = 2.0.$$

Likewise, the increased Vp-p of the tonal signal is 3.15 Vp-p, the increased Vp-p of the V27 ter (2400 b/s) signal is 4.78 Vp-p, the increased Vp-p of the V27 ter (4800 b/s) signal is 5.04 Vp-p, the increased Vp-p of the V29 (7200 b/s) signal is 7.3 Vp-p, the increased Vp-p of the V29 (9600 b/s) is 8.00 Vp-p.

An operation unit 34 is employed for controlling one touch dialing, speed dialing, and start up functions.

The operation unit 34 has number keys, one touch dialing keys, speed dialing keys, and function keys. Upon the depression of each key, a signal instructing the execution of the function that corresponds to the depressed key is transmitted via a signal line 34a to the controller circuit 36.

Figure 2:
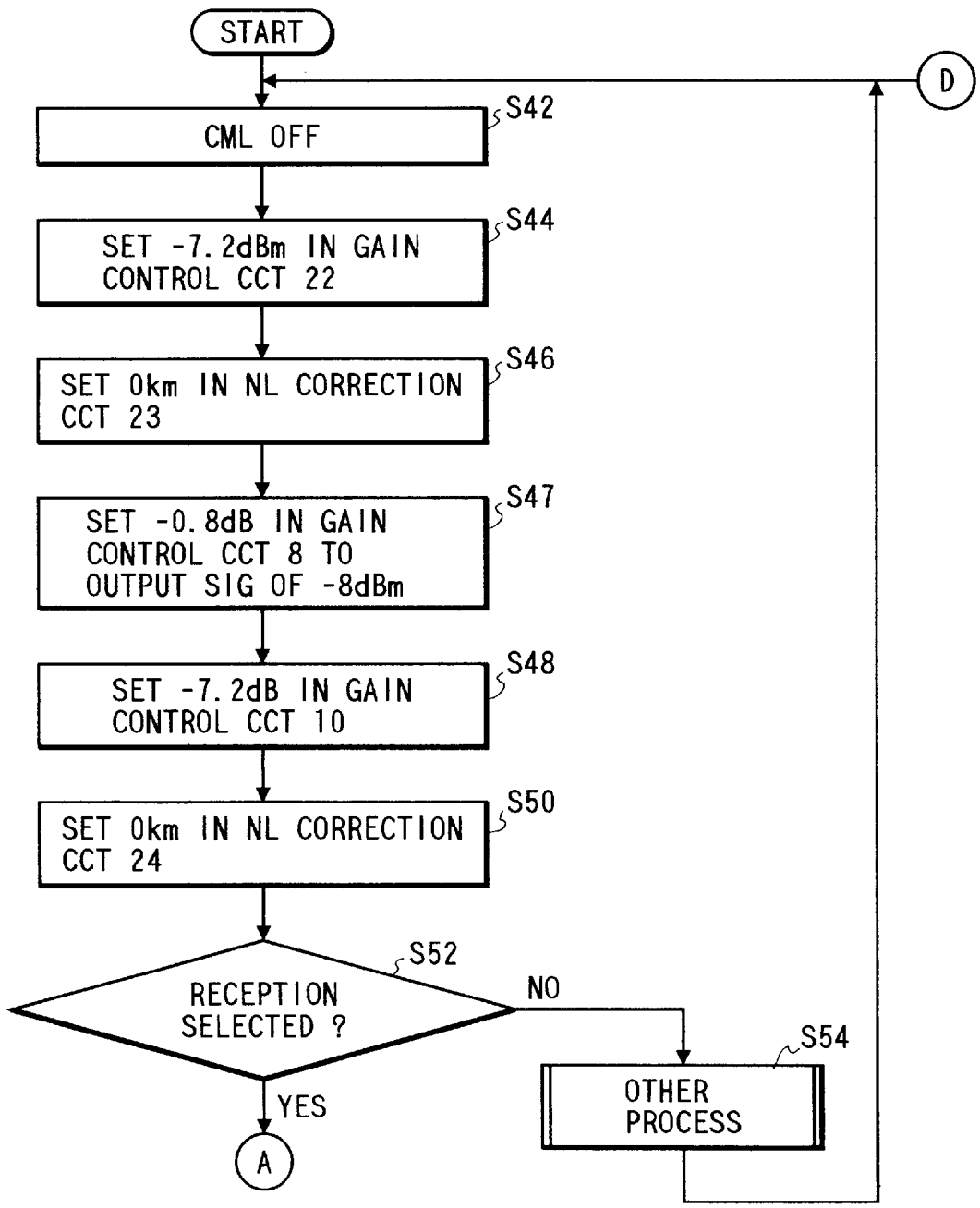
FIG. 2 is a flowchart for explaining the control processing performed by a control circuit in the facsimile apparatus in FIG. 1.
Figure 3:
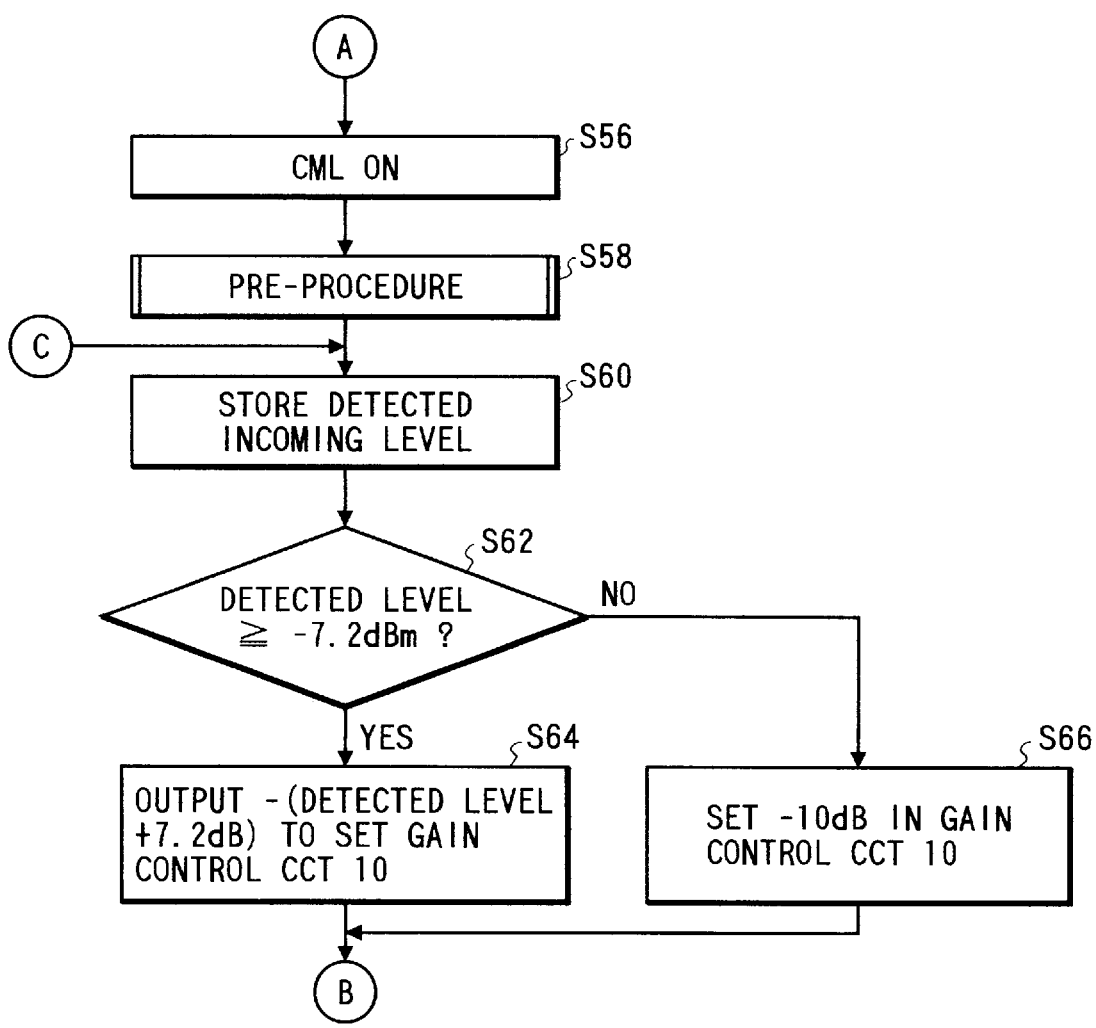
FIG. 3 is a flowchart for explaining the control processing performed by the control circuit in the facsimile apparatus in FIG. 1.
Figure 4:
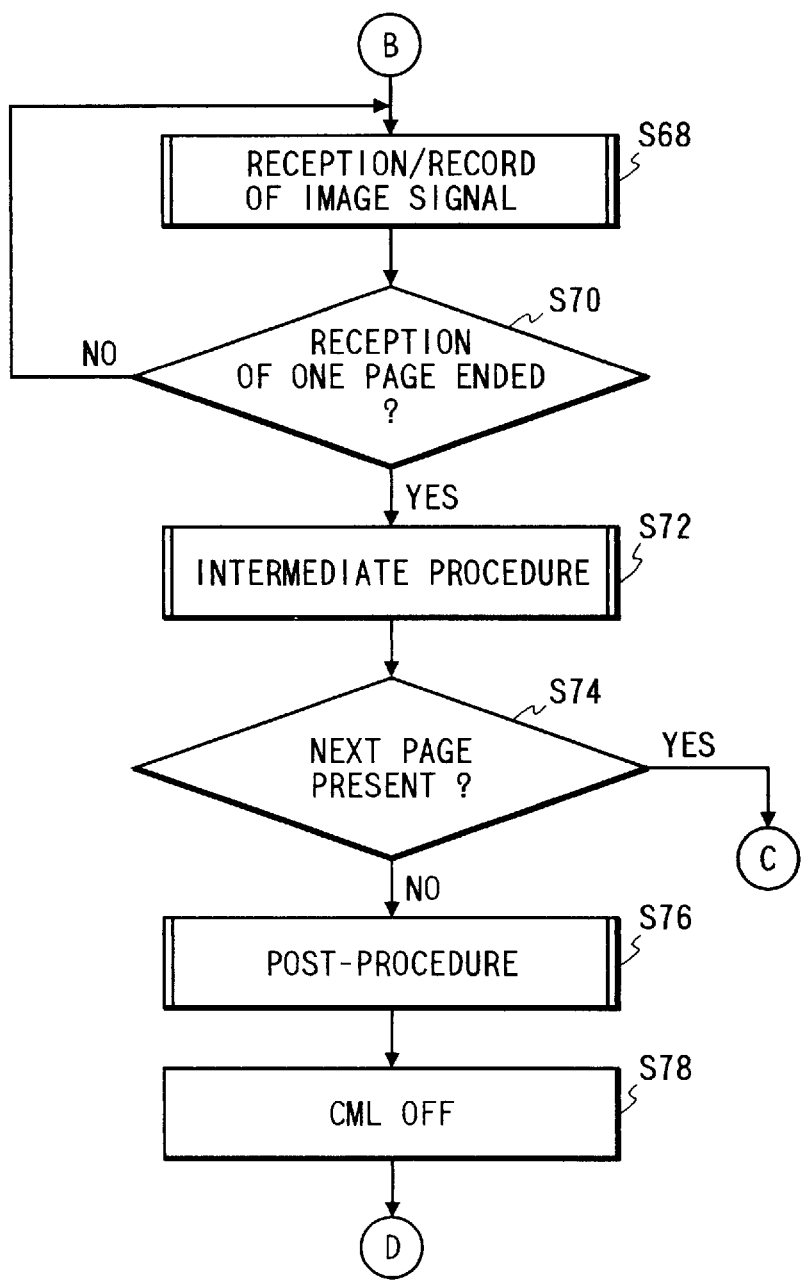
FIG. 4 is a flowchart for explaining the control processing performed by the control circuit in the facsimile apparatus in FIG. 1.

The control processing of the controller circuit 36 in the facsimile apparatus of this embodiment will now be described while referring to FIGS. 2 through 4. FIGS. 2 through 4 are flowcharts for explaining the control processing performed by the controller circuit of the facsimile apparatus in FIG. 1.

In FIG. 2, the process at step S42 is performed. At step S42, a control signal level of "0" is output via the signal line 36a, and the CML is turned off. Then, at step S44, a signal level of "−7.2" is output on the signal line 36d, and −7.2 dBm is set in the gain control circuit 22 of the modulating/demodulating device 38 in the transmitting system.

After this setting in the gain control circuit 22, at step S46, a signal level of "0" is output along the signal line 36j and 0 Km is set in the NL correction circuit 23.

After the setting in the NL correction circuit 23, at step S47, a signal level of "−0.8" is output along the signal line 36*b* to set a loss value of −0.8 dB, and transmission is performed by −8 dBm (=−7.2−0.8).

Subsequently, at step S48, a signal level of "−7.2" is output along the signal line 36*e* and a loss value of −7.2 dB is set in the gain control circuit 10 in the receiving system. More specifically, upon the receipt of a signal of 0 dBm, a signal of −7.2 dBm is output on the signal line 10*a*, and a correction equivalent to 7.2 Km is performed on this signal, so that the modulating/demodulating device 38 that is driven at 0 to 5V is set with no waveform clamping in the signal reception by 9600 b/s.

Following step S48, at step S50 a signal of "0" is output along the signal line 36*k* and 0 Km is set in the NL correction circuit 23 in the receiving system.

Then, at step S52, a check is performed to determine whether or not a reception mode has been selected. When the reception mode has been selected, the process at step S56 (shown in FIG. 3) is performed. When the reception mode is not selected, the processes at step S54 are performed.

Other processes are performed at step S54, and program execution is thereafter returned from step S54 to step S42.

At step S56 in FIG. 3, a signal level of "1" is output on the signal line 36*a* and the CML is turned on. Then, at step S58, a pre-procedure is performed. In this pre-procedure, a signal is received from the incoming level detector circuit 25 via the signal line 25*a* and the incoming level of the received signal is detected.

At step S60, the incoming level that has been detected during the pre-procedure is stored.

After this process, at step S62, a check is performed to determine whether the detected incoming level is −7.2 dBm or higher. When the detected level is −7.2 dBm or higher, the process at step S64 is performed. When the detected level is less than −7.2 dBm, the process at step S66 is preformed.

At step S64, the negative symbol is affixed to a value obtained by adding 7.2 dB to the detected incoming level, and a signal that indicates the value is output to the gain control circuit 10, via the signal line 36*e*, to perform the setting in the gain control circuit 10. A signal that is output via the signal line 36*e* is supposed to have a value of "−7.2 dBm".

At step S66, a signal of "0" is output via the signal line 36*e* and a loss value of 10 dB is set in the gain control circuit 10 in the receiving system.

After the process at step S64 or S66 is performed, a process at step S68 is performed, as is shown in FIG. 4. At this step, reception and recording of an image signal are performed.

Then, at step S70, a check is performed to determine whether or not the signal reception for one page is completed. When the signals for one page have been received, the process at step S72 is performed, while when the reception for one page has not been completed, the processing at step S68 and following step S68 is performed again.

An intermediate procedure is performed at step S72, where a signal is input via the signal line 25*a* upon signal reception, and detection of an incoming level is confirmed.

Following this, the process at step S74 is performed, where a check is performed to determine whether or not there is a following page. When there is a following page, program control is returned to step S60 (shown in FIG. 3). When there is no following page, the process at step S76 is performed.

At step S76, a post-procedure is performed. Then, the process at step S78 is performed, where a signal of "0" is output via the signal line 36*a* and the CML is turned off.

As described above, by the employment of the modulating/demodulating device 38 that is driven at a low voltage, it is possible to prevent the deterioration of the S/N ratio.

In this embodiment, a method for setting a loss value for the receiving system is employed whereby an incoming level is ensured to be as high as is possible within a range wherein for each transfer mode no clamping occurs in the input section of the modulating/demodulating device 38, but whereby an incoming level that is as high as possible is obtained within a range wherein for a transfer mode of 9600 b/s no clamping occurs in the input section of the modulating/demodulating device 38. Another method for determining a loss value for the receiving system can be employed where Vp-p values for predetermined levels for individual transfer modes are stored and the incoming levels are detected in the initial identification procedure, and a loss value for the receiving system is determined so as to obtain an incoming level that is as high as possible within a range where no clamping occurs in the input section of the modulating/demodulating device in the following transfer mode; and where, when a transfer mode is changed, a loss value for the reception mode is determined so as to obtain an incoming level that is as high as possible within a range where in the changed transfer mode no clamping occurs in the input section of the modulating/demodulating device.

(Second Embodiment)

Figure 5:
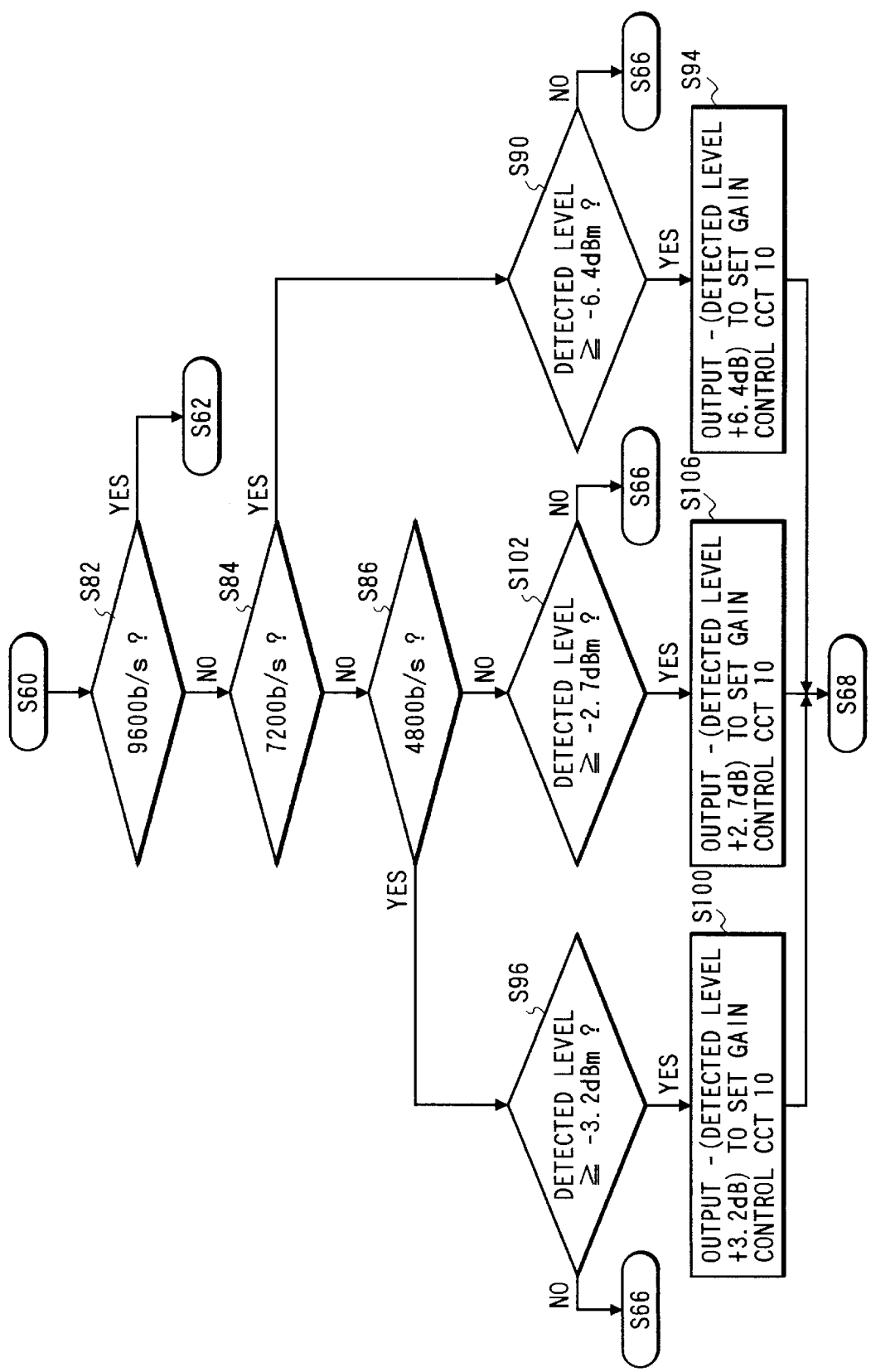
FIG. 5 is a flowchart for explaining the control processing for a facsimile apparatus according to a second embodiment of the present invention.

A facsimile apparatus according to a second embodiment of the present invention will now be described while referring to the accompanying drawings. FIG. 5 is a flowchart for explaining the control processing for the facsimile apparatus according to the second embodiment of the present invention.

The facsimile apparatus in this embodiment has the same structure as that of the facsimile apparatus in FIG. 1. This facsimile apparatus stores Vp-p values for predetermined levels in individual transfer modes, detects the incoming levels in the initial identification procedure, and determines a loss value for the reception system so as to obtain an incoming level that is as high as possible within a range where no clamping occurs in the input section of the modulating/demodulating device in the following transfer mode. Also, when a transfer mode is changed, this facsimile apparatus determines a loss value for the reception mode so as to obtain an incoming level that is as high as possible within the range where no clamping occurs in the input section of the modulating/demodulating device in the changed transfer mode.

In FIG. 5, after the detected incoming level is stored at step S60 (shown in FIG. 3), the processes at step S82, S84, and S86 are performed to determine a transfer mode to use for reception. With a transfer mode of 9600 b/s, the process at step S62 (shown in FIG. 3) is performed.

With a transfer mode of 7200 b/s, the process at step S90 is performed. At this step, a check is performed to determine whether the detected incoming level is −6.4 dBm or higher. When the detected level is −6.4 dBm or higher, the process at step S94 is performed. When the detected level is less than −6.4 dBm, the process at step S66 (shown in FIG. 3) is performed. At step S94, the negative symbol is affixed to a value that is obtained by adding 6.4 dB to the detected level value. The value is output as a signal via the signal line 36*e* to set the gain control circuit 10 and to place the signal output of −6.4 dBm on the signal line 10*a*.

With a transfer mode of 4800 b/s, the process at step S96 is performed. At this step, a check is performed to determine whether the detected incoming level is −3.2 dBm or higher.

When the detected level is −3.2 dBm or higher, the process at step S100 is performed. When the detected level is less than 31 3.2 dBm, the process at step S66 (shown in FIG. 3) is performed. At step S100, the negative symbol is affixed to a value that is obtained by adding 3.2 dB to the detected level value. The value is output as a signal via the signal line 36e to set the gain control circuit 10 and to place the signal output of −3.2 dBm on the signal line 10a.

With a transfer mode of less than 4800 b/s, the process at step S102 is performed. At this step, a check is performed to determine whether the detected incoming level is −2.7 dBm or higher. When the detected level is −2.7 dBm or higher, the process at step S106 is performed. When the detected level is less than −2.7 dBm, the process at step S66 (shown in FIG. 3) is performed. At step S106, the negative symbol is affixed to a value that is obtained by adding 2.7 dB to the detected level value. The value is output as a signal via the signal line 36e to set the gain control circuit 10 and to place the signal output of −2.7 dBm on the signal line 10a.

After the process at step S94, S100, or S106 is performed, the process at step S68 (shown in FIG. 4) is performed.

As described above, by the employment of the modulating/demodulating device 38 that is driven at a low voltage, it is possible to prevent the deterioration of the S/N ratio.

Although the setting of the loss value in the receiving system has been explained in the first and the second embodiment, the same thing can be considered for the transmitting system. Supposing that the transfer mode is 9600 b/s and the correction value of the NL correction circuit is 7.2 Km, since the level that can be output from the modulating/demodulating device 38 is −7.2 dBm, a fixed gain for the telephone line circuit 40 is 7.2 dB, and to output a signal of −15 dBm, the modulating/demodulating device 38 outputs a signal of −22.2 (=−15−7.2) dBm, and the circuit 40 raises the level by 7.2 dB. Because the signal level is amplified after it has been attenuated, this is a wasteful process.

To overcome this shortcoming, such a method is employed that a transmission signal is output at the maximum level by the modulating/demodulating device, and a gain/attenuation means, which is provided in the telephone line circuit 40, controls the transmission level of the signal.

(Third Embodiment)

Figure 6:
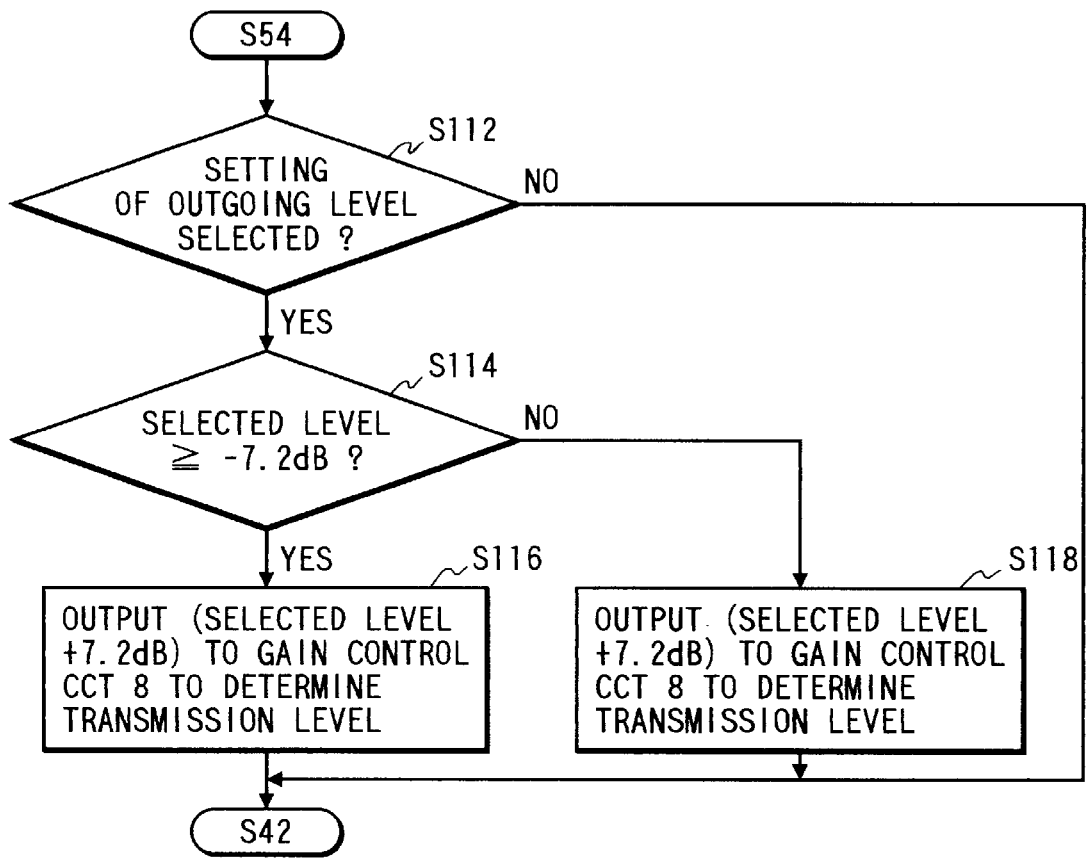
FIG. 6 is a flowchart for explaining the control processing for a facsimile apparatus according to a third embodiment of the present invention.
Figure 7:
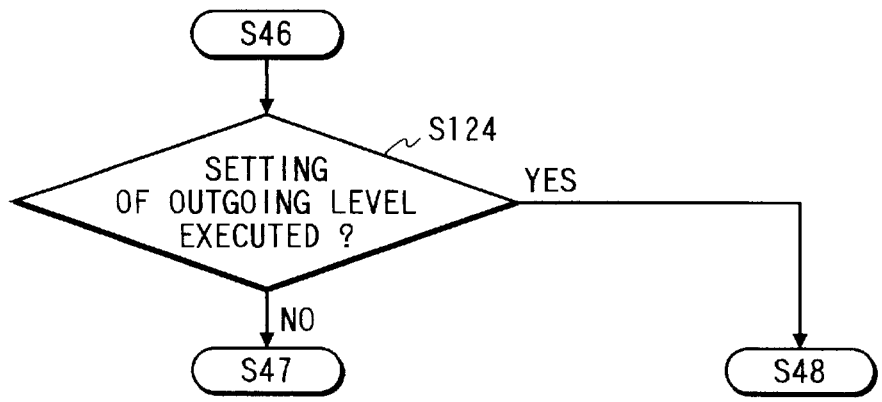
FIG. 7 is a flowchart for explaining the control processing for a facsimile apparatus according to the third embodiment of the present invention.

While referring to FIGS. 6 and 7, an explanation will now be given for a facsimile apparatus that outputs a transmission signal from its modulating/demodulating device at the maximum level, and controls the transmission level of the signal with a gain/attenuation means, which is provided in the telephone line circuit 40. FIGS. 6 and 7 are flowcharts for explaining the control processing for a controller circuit of a facsimile apparatus according to a third embodiment of the present invention.

The facsimile apparatus in this embodiment has the same arrangement as the facsimile apparatus in FIG. 1.

The control processing performed by the controller circuit will now be explained.

In FIG. 6, after other processes are performed at step S54 (shown in FIG. 2), the process at step S112 is performed. A check is performed at step S112 to determine whether or not an outgoing signal level has been selected or not. When an outgoing level has been selected, the process at step S114 is performed. When an outgoing level has not been selected, the processes following step S42 (shown in FIG. 2) are performed.

At step S114, a check is performed to determine whether the selected level is −7.2 dB or higher. When the selected level is −7.2 dB or higher, the process at step S116 is performed. When the selected level is less than −7.2 dB, the process at step S118 is performed.

At step S116, a selected value, +7.2 dB, is output on the signal line 36b to the gain control circuit 8 in the transmitting system to determine the transmission level.

At step S118, a selected value, +7.2 dB, is output via the signal line 36b to the gain control circuit 8 in the transmitting system to determine the transmission level.

After the process is performed at step S116 or S118, the process at step S42 (shown in FIG. 2) is performed.

In FIG. 7, 0 Km is set in the NL correction circuit 23 in the transmitting system at step S46 (shown in FIG. 2), and then the process at step S124 is performed. A check is performed at step S124 to determine whether or not the setting of an outgoing level is executed. When the outgoing level is set, the process at step S47 (shown in FIG. 2) is performed. When the outgoing level is not set, the process at step S48 (shown in FIG. 2) is performed.

As described above, by the employment of the modulating/demodulating device 38 that is driven at a low voltage, it is possible to prevent the deterioration of the S/N ratio.

(Fourth Embodiment)

A facsimile apparatus according to a fourth embodiment of the present invention will now be described while referring to FIG. 8. The facsimile apparatus in this embodiment has the same arrangement as the facsimile apparatus in FIG. 1. The facsimile apparatus in this embodiment has a loss means provided in its modulating/demodulating device and determines an outgoing level by employing a combination of the loss means and the gain/loss means in the telephone line circuit. When an outgoing level is set of −7.2 dBm or higher, for example, a transmission signal of −7.2 dBm is output from the modulating/demodulating device and a gain for the transmission signal is increased by the external line circuit. When an outgoing level is set of less than −7.2 dBm, a gain by the external line circuit is fixed at "1" and the outgoing level from the modulating/demodulating device can be changed.

Figure 8:
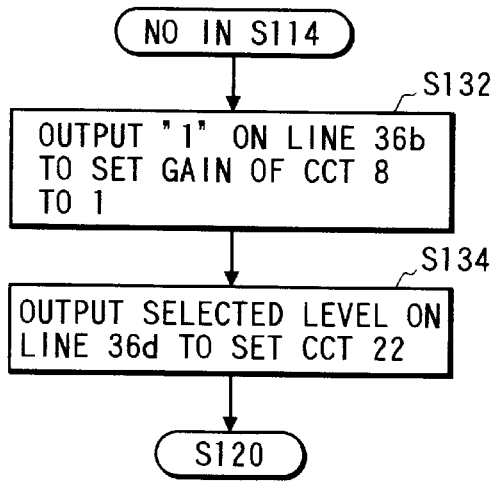
FIG. 8 is a flowchart for explaining the control processing for a facsimile apparatus according to a fourth embodiment of the present invention.

In FIG. 8, when, at step S114 (shown in FIG. 6), the selected outgoing level is less than −7.2 dB, the process at step S132 is performed. At step S132, a signal level of "1" is output on the signal line 36b and a gain for the gain control circuit 8 in the transmitting system is set to "1".

Then, the process at step S116 is performed, where the value of the selected outgoing level is output on the signal line 36d to set the gain control circuit 22 in the transmitting system.

After step S116, the process at step S42 (shown in FIG. 2) is performed.

As described above, the deterioration of the S/N ratio at the time of transmission can be prevented and a more preferable S/N ratio can be obtained.

It should be noted that, since the level of a signal that can be output at 3.5 Vp-p varies depending on the transmission mode, the outgoing level from the modulating/demodulating device can be changed in consonance with a transmission mode. In other words, as the transfer mode is shifted to V29 (7200 b/s), V27 ter (4800 b/s), or V27 ter (2400 b/s), the outgoing level from the modulating/demodulating device can be increased.

(Fifth Embodiment)

A facsimile apparatus according to a fifth embodiment of the present invention will now be described while referring to FIGS. 9 through 13. FIGS. 9 through 13 are flowcharts for explaining the control processing for the facsimile apparatus according to the fifth embodiment of the present invention.

The facsimile apparatus in this embodiment comprises user line equalizing means in addition to the arrangement of the facsimile apparatus shown in FIG. 1. As an equalizing value is increased, the facsimile apparatus in this embodiment increases the loss value for the receiving system.

An explanation will be given for the control processing when a signal that has a corrected level that is equivalent to 7.2 Km is received in the transfer mode for 9600 b/s, i.e., when an amplitude characteristic on the telephone line is flat.

Figure 9:
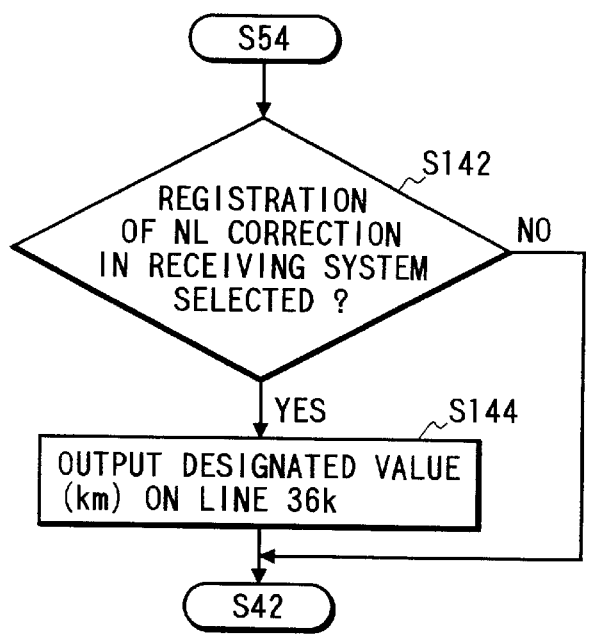
FIG. 9 is a flowchart for explaining the control processing for a facsimile apparatus according to a fifth embodiment of the present invention.

In FIG. 9, after the other processes are performed because a reception mode is not selected at step S54 (shown in FIG. 2), a check is performed at step S142 to determine whether or not the registration of a correction, that is performed by the NL correction circuit 24 in the receiving system, has been selected. When the registration of the correction performed by the NL correction circuit 24 in the receiving system has been selected, the process at step S144 is performed. When the registration of the correction performed by the NL correction circuit in the receiving system has not been selected, the process at step S42 (shown in FIG. 2) is performed.

At step S144, a signal indicating a designated Km value is output on the signal line 36k to the NL correction circuit 24 in the receiving system.

Figure 10:
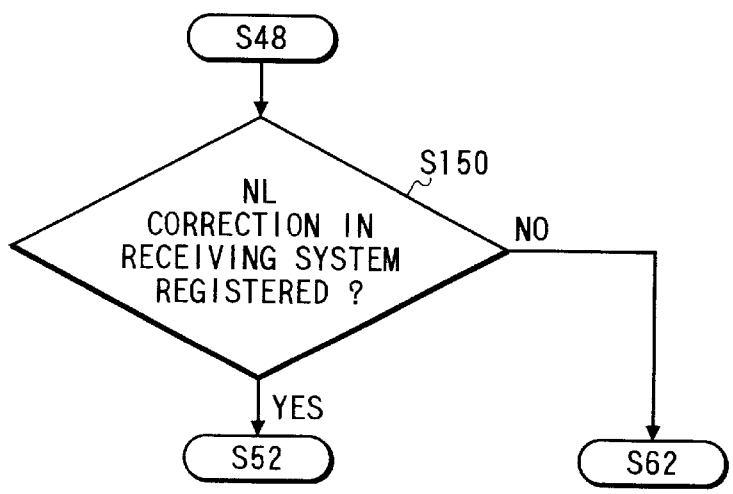
FIG. 10 is a flowchart for explaining the control processing for a facsimile apparatus according to the fifth embodiment of the present invention.

In FIG. 10, after the loss value of 7.2 dB is set in the gain control circuit 10 in the receiving system at step S48 (shown in FIG. 2), the process at step S150 is performed. At step S150, a check is performed to determine whether or not the correction performed by the NL correction circuit 24 in the receiving system is registered. When the correction of the NL correction circuit 24 in the receiving system is registered, the process at step S52 (shown in FIG. 2) is performed. When the correction of the NL correction circuit 24 in the receiving system is not registered, the process at step S50 (shown in FIG. 2) is performed.

Figure 11:
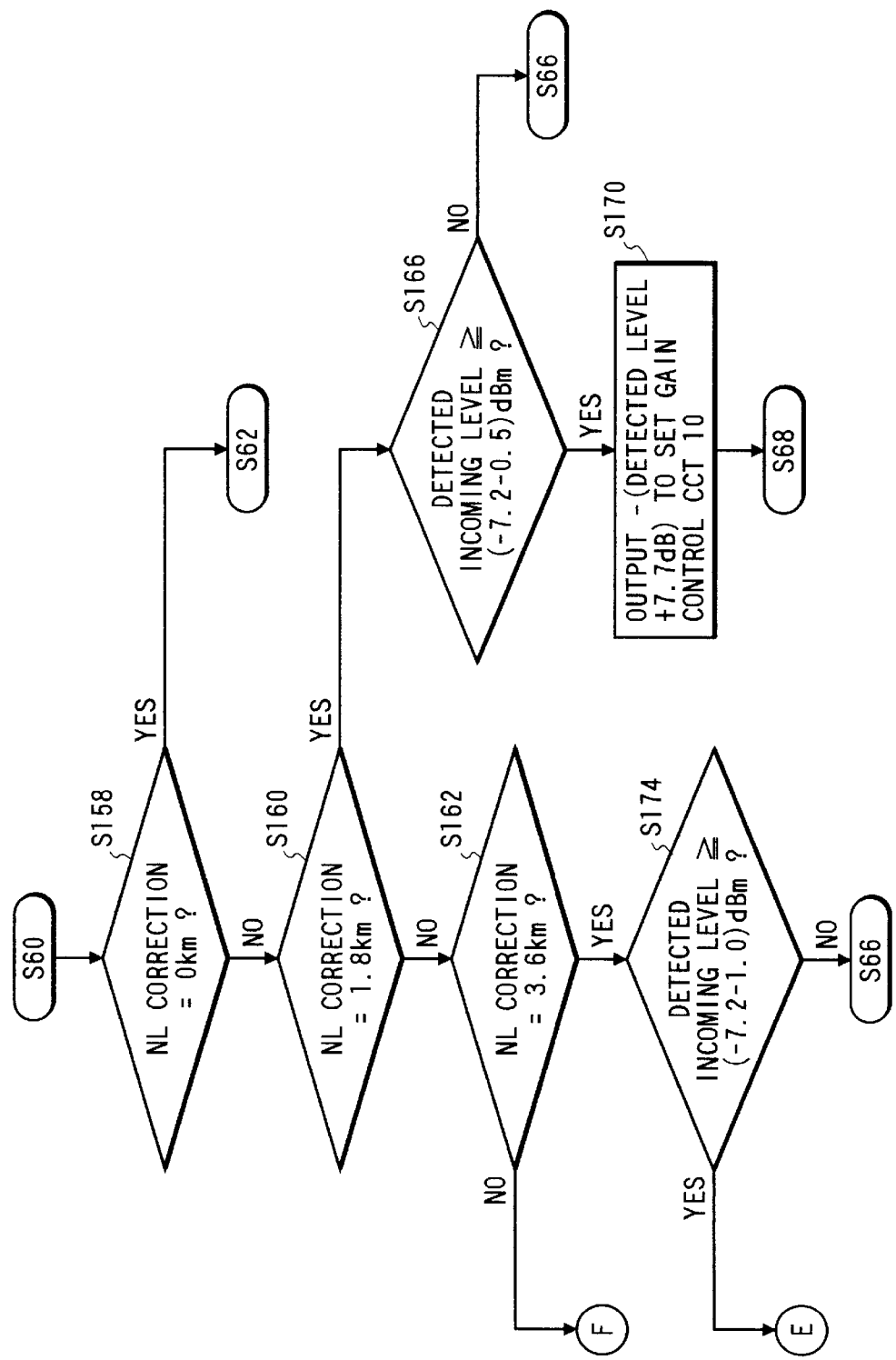
FIG. 11 is a flowchart for explaining the control processing for a facsimile apparatus according to the fifth embodiment of the present invention.

In FIG. 11, after the incoming level is found and stored during the pre-procedure at step S60 (shown in FIG. 3), the processes at steps S158, S160, and S162 are performed to determine a value that is to be employed for NL correction in the receiving system. When the NL correction value in the receiving system is 0 Km, the process at step S62 (shown in FIG. 3) is performed. When the NL correction value in the receiving system is 1.8 Km, the process at step S166 is performed. When the NL correction value in the receiving system is 3.6 Km, the process at step S174 is performed. When the NL correction value in the receiving system is 7.2 Km, the process at step S182 (shown in FIG. 13) is performed.

At step S166, a check is performed to determine whether the incoming level is higher than or equal to −7.7 (=−7.2−0.5) dBm. If the incoming level is higher than or equal to −7.7 dBm, the process at step S170 is performed. If the incoming level is less than −7.7 dBm, the process at step S66 (shown in FIG. 3) is performed.

At step S170, the negative symbol is affixed to a value obtained by adding 7.7 dB to the incoming level value, and that value is output as a signal on the signal line 36e to perform the setting for the gain control circuit 10 in the receiving system. After step S170, the process at step S68 (shown in FIG. 4) is performed.

At step S174, a check is performed to determine whether the incoming level is higher than or equal to −8.2 (=−7.2−1.0) dBm. If the incoming level is higher than or equal to −8.2 dBm, the process at step S176 (shown in FIG. 12) is performed. If the incoming level is less than −8.2 dBm, the process at step S66 (shown in FIG. 3) is performed.

At step S176, as is shown in FIG. 12, the negative symbol is affixed to a value obtained by adding 8.2 dB to the incoming level value, and that value is output as a signal on the signal line 36e to perform the setting for the gain control circuit 10 in the receiving system. After step S176, the process at step S68 (shown in FIG. 4) is performed.

At step S182, as is shown in FIG. 13, a check is performed to determine whether the incoming level is higher than or equal to −9.2 (=−7.2−2.0) dBm. If the incoming level is higher than or equal to −9.2 dBm, the process at step S186 is performed. If the incoming level is less than −9.2 dBm, the process at step S66 (shown in FIG. 3) is performed.

At step S184, the negative symbol is affixed to a value obtained by adding 9.2 dB to the incoming level value, and that value is output as a signal on the signal line 36e to perform the setting for the gain control circuit 10 in the receiving system. After step S182, the process at step S68 (shown in FIG. 4) is performed.

Although in this embodiment the NL correction circuit is provided in its telephone line circuit, the NL correction circuit can be provided in the modulating/demodulating device.

In the arrangement where the NL correction circuit is provided in the modulating/demodulating device, as the NL correction value is increased, the Vp-p value is likewise increased. Thus a control method can be adopted for setting a lower outgoing level from the modulating/demodulating device as the NL correction value becomes greater.

What is claimed is:

1. A facsimile apparatus, which has a modulating/demodulating device having a plurality of modes and being operable at a voltage of five volts, said modulating/demodulating device being correctly operable when a level of an input signal is within a predetermined range, while not correctly operable when the level is outside the predetermined range, said facsimile apparatus comprising:

loss means, provided in a receiving system and provided outside said modulating/demodulating device, for reducing a level of a received signal;

detecting means for detecting a level of an input signal; and control means for instructing, for said loss means, a reduction value for said level of said received signal in accordance with a mode of the modulating/demodulating device, wherein said control means discriminates whether a level of the input signal detected by said detecting means is within a predetermined range, and said control means inhibits said loss means from reducing the level of the received signal if it is discriminated that the detected level is within the predetermined range, while causes said loss means to reduce the level of the received signal to be within the predetermined range if it is discriminated that the detected level is outside the predetermined range.

2. A facsimile apparatus according to claim 1, wherein said control means of the present invention instructs a smaller value for the reduction of said level of said received signal as said level of said received signal becomes lower.

3. A facsimile apparatus according to claim 1, further comprising incoming level detection means for storing a voltage value that corresponds to a predetermined level for each transfer mode, and for detecting an incoming level during initial identification procedures, wherein, dependent on the detection result obtained by said incoming level detection means, said control means instructs, for said loss means, the level reduction value for said received signal to ensure an incoming level value for said transfer mode that equals the maximum possible value within a predetermined range.

4. A facsimile apparatus according to claim 2, further comprising incoming level detection means for storing a voltage value that corresponds to a predetermined level for each transfer mode, and for detecting an incoming level during initial identification procedures, wherein, dependent on the detection result obtained by said incoming level detection means, said control means instructs, for said loss means, a level reduction value for said received signal to ensure an incoming level value for said transfer mode that equals the maximum possible value within a predetermined range.

5. A facsimile apparatus according to claim 1, wherein, when a transfer mode is to be altered by said initial identification procedures, said control means instructs, for said loss means, the level reduction value to ensure an incoming level value for said transfer mode, wherein data are entered to said modulating/demodulating device, that equals the maximum possible value within a predetermined range.

6. A facsimile apparatus according to claim 2, wherein, when a transfer mode is to be altered by said initial identification procedures, said control means instructs, for said loss means, the level reduction value to ensure an incoming level value for said transfer mode, wherein data are entered to said modulating/demodulating device, that equals the maximum possible value within a predetermined range.

7. A facsimile apparatus according to claim 1, further comprising user equalizing means, wherein said control means controls said loss means by increasing a value for a reduction of a level as an equalization value for said user equalizing means becomes greater.

8. A facsimile apparatus according to claim 2, further comprising user equalizing means, wherein said control means controls said loss means by increasing a value for a reduction of a level as an equalization value for said user equalizing means becomes greater.

9. A facsimile apparatus according to claim 3, further comprising user equalizing means, wherein said control means controls said loss means by increasing a value for a reduction of a level as an equalization value for said user equalizing means becomes greater.

10. A facsimile apparatus according to claim 4, further comprising user equalizing means, wherein said control means controls said loss means by increasing a value for a reduction of a level as an equalization value for said user equalizing means becomes greater.

11. A facsimile apparatus according to claim 5, further comprising user equalizing means, wherein said control means controls said loss means by increasing a value for a reduction of a level as an equalization value for said user equalizing means becomes greater.

12. A facsimile apparatus according to claim 6, further comprising user equalizing means, wherein said control means controls said loss means by increasing a value for a reduction of a level as an equalization value for said user equalizing means becomes greater.

13. A facsimile apparatus according to claim 1, wherein said loss means reduces the level of the received signal only when the received signal level is outside a control range of the modulating/demodulating device.

14. A facsimile apparatus according to claim 1, wherein the plurality of modes are in accordance with CCITT Recommendation V.

15. A facsimile apparatus, which incorporates a modulating/demodulating device having a plurality of modes and being operable at a voltage of five volts, comprising:

gain control means, which is provided in a transmitting system and provided outside said modulating/demodulating device, for altering a level of a signal transmitted by said modulating/demodulating device;

detecting means for detecting a level of a signal outputted onto a communication line; and control means for instructing, for said gain control means, a value for alteration of said level of said signal in accordance with a mode of the modulating/demodulating device, wherein said control means discriminates whether a maximum level of the signal transmitted by said modulating/demodulating device is greater than the detected level, and said control means inhibits said gain control means from altering the level of the signal and causes said modulating/demodulating device to transmit the signal of the detected level, if it is discriminated that the maximum level is greater than the detected level, while causes said modulating/demodulating device to transmit the signal of the maximum level and causes said gain control means to amplify the maximum level to be of the detected level, if it is discriminated that the maximum level is less than the detected level.

16. A facsimile apparatus according to claim 15, further comprising loss means, which is provided in said modulating/demodulating device, for reducing said level of said signal, wherein said control means combines a level reduction value for a loss means and a level alteration value for said gain means and determines said level reduction value and said level alteration value.

17. A facsimile apparatus according to claim 16, further comprising user equalizing means, wherein, depending on an increase in equalization by said user equalizing means, said control means gradually increases said level reduction value of said loss means.

18. A facsimile apparatus according to claim 15, further comprising user equalizing means, wherein, depending on an increase in equalization by said user equalizing means, said control means gradually increases said level reduction value of said loss means.

19. A facsimile apparatus according to claim 15, wherein said gain means alters the level of the transmitted signal only when the transmitted signal level is outside a control range of the modulating/demodulating device.

20. A facsimile apparatus according to claim 15, wherein the plurality of modes are in accordance with CCITT Recommendation V.

21. A method for operating a facsimile apparatus, which has a modulating/demodulating device having a plurality of modes and being operable at a voltage of five volts, said modulating/demodulating device being correctly operable when a level of an input signal is within a predetermined range, while not correctly operable when the level is outside the predetermined range, said method comprising the steps of:

reducing a level of a received signal by a level reduction value in a receiving system which is outside the modulating/demodulating device;

detecting a level of an input signal;

discriminating whether a level of the input signal detected by the step of detecting is within a predetermined range; and controlling the level reduction value in accordance with a mode of the modulating/demodulating device by inhibiting reducing of the level of the received signal if it is discriminated that the detected level is within the predetermined range, while controlling reducing of the level of the received signal to be within the predetermined range if it is discriminated that the detected level is outside the predetermined range.

22. A method according to claim 21, wherein the step of controlling decreases the level reduction value as the level of said received signal becomes lower.

23. A method according to claim 21, further comprising the steps of storing a voltage value that corresponds to a predetermined level for each transfer mode, and detecting an incoming level during initial identification procedures, wherein, dependent on the detection result obtained by said incoming level detection means, the step of controlling controls the level reduction value for said received signal to ensure an incoming level value for said transfer mode that equals the maximum possible value within a predetermined range.

24. A method according to claim 22, further comprising the steps of storing a voltage value that corresponds to a predetermined level for each transfer mode, and detecting an incoming level during initial identification procedures, wherein, dependent on the detection result obtained by said incoming level detection means, the step of controlling controls the level reduction value for said received signal to ensure an incoming level value for said transfer mode that equals the maximum possible value within a predetermined range.

25. A method according to claim 21, wherein, when a transfer mode is to be altered by said initial identification procedures, the step of controlling controls the level reduction value to ensure an incoming level value for said transfer mode, wherein data are entered to said modulating/demodulating device, that equals the maximum possible value within a predetermined range.

26. A method according to claim 22, wherein, when a transfer mode is to be altered by said initial identification procedures, the step of controlling controls the level reduction value to ensure an incoming level value for said transfer mode, wherein data are entered to said modulating/demodulating device, that equals the maximum possible value within a predetermined range.

27. A method according to claim 21, further comprising the step of equalizing the received signal using an equalization value, and wherein the step of controlling increases the level reduction value as the equalization value becomes greater.

28. A method according to claim 22, further comprising the step of equalizing the received signal using an equalization value, and wherein the step of controlling increases the level reduction value as the equalization value becomes greater.

29. A method according to claim 23, further comprising the step of equalizing the received signal using an equalization value, and wherein the step of controlling increases the level reduction value as the equalization value becomes greater.

30. A method according to claim 24, further comprising the step of equalizing the received signal using an equalization value, and wherein the step of controlling increases the level reduction value as the equalization value becomes greater.

31. A method according to claim 25, further comprising the step of equalizing the received signal using an equalization value, and wherein the step of controlling increases the level reduction value as the equalization value becomes greater.

32. A method according to claim 26, further comprising the step of equalizing the received signal using an equalization value, and wherein the step of controlling increases the level reduction value as the equalization value becomes greater.

33. A method according to claim 21, wherein the step of reducing is performed only when the received signal level is outside a control range of the modulating/demodulating device.

34. A method according to claim 21, wherein the plurality of modes are in accordance with CCITT Recommendation V.

35. A method for operating a facsimile apparatus, which has a modulating/demodulating device having a plurality of modes and being operable at a voltage of five volts, comprising the steps of:

altering a level of a signal transmitted by said modulating/demodulating device by a level alteration value in a transmitting system which is outside said modulating/demodulating device;

detecting a level of a signal outputted onto a communication line;

discriminating whether a maximum level of the signal transmitted by said modulating/demodulating device is greater than the detected level; and controlling the level alteration value in accordance with a mode of the modulating/demodulating device by inhibiting altering of the level of the signal and causing transmission of the signal of the detected level, if it is discriminated that the maximum level is greater than the detected level, while causing transmission of the signal of the maximum level and causing amplification of the maximum level to be of the detected level, if it is discriminated that the maximum level is less than the detected level.

36. A method according to claim 35, further comprising the step of reducing the level of the signal in said modulating/demodulating device using a level reduction value, and wherein the step of controlling includes combining the level reduction value and the level alteration value and determining the level reduction value and the level alteration value.

37. A method according to claim 36, further comprising the step of equalizing the signal using an equalization value, and wherein the step of controlling gradually increases the level reduction value as the equalization value increases.

38. A method according to claim 35, further comprising the step of equalizing the signal using an equalization value, and wherein the step of controlling gradually increases the level reduction value as the equalization value increases.

39. A method according to claim 35, wherein the step of altering is performed only when the transmitted signal level is outside a control range of the modulating/demodulating device.

40. A method according to claim 35, wherein the plurality of modes are in accordance with CCITT Recommendation V.

* * * * *

UNITED STATES PATENT AND TRADEMARK OFFICE
CERTIFICATE OF CORRECTION

PATENT NO. : 5,886,796
DATED : March 23, 1999
INVENTOR(S) : Takehiro Yoshida

It is certified that error appears in the above-identified patent and that said Letters Patent is hereby corrected as shown below:

Column 5, line 61, please delete "line 36/. and insert -- line 36i --.

Column 9, line 3, please delete "than 31 3.2" and insert -- than -3.2 --.

Signed and Sealed this

Thirtieth Day of November, 1999

Attest:

Q. TODD DICKINSON

*Attesting Officer*          *Acting Commissioner of Patents and Trademarks*